US010106208B2

(12) United States Patent
Barrios Albert et al.

(10) Patent No.: US 10,106,208 B2
(45) Date of Patent: Oct. 23, 2018

(54) TAILGATE ASSEMBLY WITH INTEGRATED TABLE AND SEATING SUBASSEMBLY

(71) Applicant: FORD GLOBAL TECHNOLOGIES, LLC, Dearborn, MI (US)

(72) Inventors: Jorge Guillermo Barrios Albert, Azcapotzalco (MX); Ana Magdalena Dominguez Cuevas, Cd.Satelite (MX)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 15/410,012

(22) Filed: Jan. 19, 2017

(65) Prior Publication Data
US 2018/0201329 A1   Jul. 19, 2018

(51) Int. Cl.
   *B60P 3/34*      (2006.01)
   *B62D 33/027*    (2006.01)
   *B60R 11/00*     (2006.01)

(52) U.S. Cl.
   CPC .......... *B62D 33/0273* (2013.01); *B60R 11/00* (2013.01); *B60R 2011/004* (2013.01)

(58) Field of Classification Search
   CPC ..... A47B 83/02; A47B 13/088; A47B 87/002; B64D 11/0638; B64D 11/06; A47C 7/006; A47C 3/18
   USPC ........................................ 296/26.1, 64, 57.1
   See application file for complete search history.

(56) References Cited

U.S. PATENT DOCUMENTS

| | | | | |
|---|---|---|---|---|
| 3,642,156 | A * | 2/1972 | Stenson | B60P 1/435 296/61 |
| 4,601,632 | A * | 7/1986 | Agee | B60P 1/431 14/71.1 |
| 5,205,603 | A * | 4/1993 | Burdette, Jr. | B60R 3/02 182/195 |
| 5,215,346 | A * | 6/1993 | Reitzloff | B62D 33/0273 296/37.6 |
| 5,244,335 | A * | 9/1993 | Johns | B60P 1/435 296/61 |
| 5,312,149 | A * | 5/1994 | Boone | B62D 33/0273 296/61 |
| 5,533,771 | A * | 7/1996 | Taylor | B60P 1/435 108/44 |
| 5,540,158 | A * | 7/1996 | Ford | A47B 3/08 108/115 |
| 5,575,521 | A | 11/1996 | Speis | |
| 5,803,523 | A * | 9/1998 | Clark | B60P 1/435 14/71.1 |
| 5,823,595 | A | 10/1998 | Tronco | |
| 6,193,294 | B1 | 2/2001 | Disner et al. | |
| 6,364,391 | B1 * | 4/2002 | Everett | B60N 2/24 296/51 |
| 6,454,338 | B1 * | 9/2002 | Glickman | B60P 1/435 296/26.1 |
| 6,588,822 | B1 * | 7/2003 | Duvall, Jr. | B60N 2/3011 296/57.1 |
| 6,631,938 | B1 | 10/2003 | Burns | |
| 6,834,903 | B2 * | 12/2004 | Harper | B62D 33/03 296/51 |

(Continued)

*Primary Examiner* — Kiran B Patel
(74) *Attorney, Agent, or Firm* — Jason Rogers; King & Schickli, PLLC

(57) ABSTRACT

A tailgate assembly includes a tailgate having an internal storage compartment. A table and seating subassembly is displaceable between a stowed position held in that internal storage compartment and a use position deployed from that internal storage compartment.

20 Claims, 5 Drawing Sheets

(56) References Cited

U.S. PATENT DOCUMENTS

| | | | | |
|---|---|---|---|---|
| 6,905,158 B1 * | 6/2005 | Bastian | B60R 3/02 | 280/164.1 |
| 6,991,277 B1 * | 1/2006 | Esler | B60P 1/435 | 296/26.08 |
| 7,201,424 B1 * | 4/2007 | Fournier | B62D 33/0273 | 296/57.1 |
| 7,261,357 B1 * | 8/2007 | Bechen | B60R 3/02 | 296/57.1 |
| 7,513,557 B2 * | 4/2009 | Leigh-Monstevens | B60N 2/015 | 296/57.1 |
| 7,549,692 B2 * | 6/2009 | Washington | B60P 1/435 | 296/61 |
| 7,628,439 B1 * | 12/2009 | Strong | B62D 33/0273 | 108/44 |
| D674,162 S * | 1/2013 | Gooch | D34/32 | |
| 8,511,734 B2 * | 8/2013 | Hutchins, Jr. | B60P 1/435 | 296/61 |
| 9,540,051 B2 * | 1/2017 | Bauer | B62D 33/03 | |
| 2002/0109369 A1 | 8/2002 | Boomhower et al. | | |
| 2007/0007789 A1 * | 1/2007 | Bowden | B60N 2/24 | 296/64 |
| 2007/0237614 A1 * | 10/2007 | Johnson | B60P 1/431 | 414/467 |
| 2011/0121045 A1 * | 5/2011 | Agerton | B60R 11/06 | 224/546 |
| 2012/0104786 A1 * | 5/2012 | Wimberley | B60N 2/015 | 296/65.16 |
| 2014/0291366 A1 * | 10/2014 | Nelson | B60R 9/065 | 224/404 |
| 2017/0274940 A1 * | 9/2017 | Povinelli | B62D 33/037 | |
| 2017/0361878 A1 * | 12/2017 | Loew | B60R 3/02 | |

* cited by examiner

TAILGATE ASSEMBLY WITH INTEGRATED TABLE AND SEATING SUBASSEMBLY

TECHNICAL FIELD

This document relates generally to the motor vehicle equipment field and, more particularly, to a tailgate assembly that incorporates an integrated table and seating subassembly that may be quickly deployed from a stowed position held in an internal storage compartment within the tailgate to a use position deployed from the internal storage compartment.

BACKGROUND

Pickup trucks are a very popular motor vehicle of choice in today's market. This is primarily due to the versatility they provide for carrying cargo and meeting a multitude of motor vehicle operator needs.

Many pickup truck operators attend football games or other sports and social events where a deployable table and complimentary seating are desired. This document relates to a new and improved tailgate assembly with an integrated table and seating subassembly that is lightweight, may be stowed when not in use in a manner that does not interfere with the use, operation and cargo hauling capacity of the pickup truck and may be quickly and easily deployed when needed.

SUMMARY

In accordance with the purposes and benefits described herein, a tailgate assembly is provided. That tailgate assembly comprises a tailgate having an internal storage compartment and a table and seating subassembly displaceable between a stowed position held in that internal storage compartment and a use position deployed from that internal storage compartment.

The tailgate assembly may further include a sliding track connecting the table and seating subassembly to the tailgate. That sliding track may include a first telescoping rail and a second telescoping rail.

The table and seating subassembly may include a table body. In addition, the table and seating subassembly may include a first support and a second support carried on the table body. The first support may include a first leg connected by a first pivot to the table body. The first support may also include a second leg connected by a second pivot to the table body.

In addition, the table and seating subassembly may include a first seat connected between the first leg and the second leg. The table and seating subassembly may include a third pivot connecting the first seat to the first leg and a fourth pivot connecting the first seat to the second leg. Further, the table and seating subassembly may include a first strut carried on the first seat. The table and seating subassembly may also include a second strut carried on the first seat.

The tailgate assembly may further include a first receiver on the first leg and a second receiver on the second leg. When the table and seating subassembly is deployed into the use position, a first distal end of the first strut is pinned into the first receiver and a second distal end of the second strut is pinned into the second receiver in order to hold the first seat in a proper orientation for use.

The second support of the tailgate assembly may include a third leg connected by a fifth pivot to the table body. The second support may also include a fourth leg connected by a sixth pivot to the table body.

Further, the table and seating subassembly may include a second seat connected between the third leg and the fourth leg. In addition, the table and seating subassembly may include a seventh pivot connecting the second seat to the third leg and an eighth pivot connecting the second seat to the fourth leg.

The table and seating subassembly may include a third strut carried on the second seat as well as a fourth strut carried on the second seat. In addition, the tailgate assembly may further include a third receiver on the third leg and a fourth receiver on the fourth leg. When the table and seating subassembly is deployed into the use position, a third distal end of the third strut is pinned into the third receiver and a fourth distal end of the fourth strut is pinned into the fourth receiver in order to hold the second seat in the proper orientation for seating.

In accordance with an additional aspect, a method is provided of deploying a table and seating from a tailgate. That method comprises the steps of: (a) sliding a table and seating subassembly out from an internal storage compartment in the tailgate, (b) erecting a first support and a second support of the table and seating subassembly, (c) displacing a first seat and a second seat of the table and seating subassembly into a use position and (d) locking the first seat and the second seat into the use position.

In the following description, there are shown and described several preferred embodiments of the tailgate assembly as well as the related method of deploying a table and seating from a tailgate. As it should be realized, the tailgate assembly and related method are capable of other, different embodiments and their several details are capable of modification in various, obvious aspects all without departing from the tailgate assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tailgate assembly and method and together with the description serve to explain certain principles thereof. In the drawing figures.

Reference will now be made in detail to the present preferred embodiments of the tailgate assembly, examples of which are illustrated in the accompanying drawing figures.

DETAILED DESCRIPTION

Figure 1:
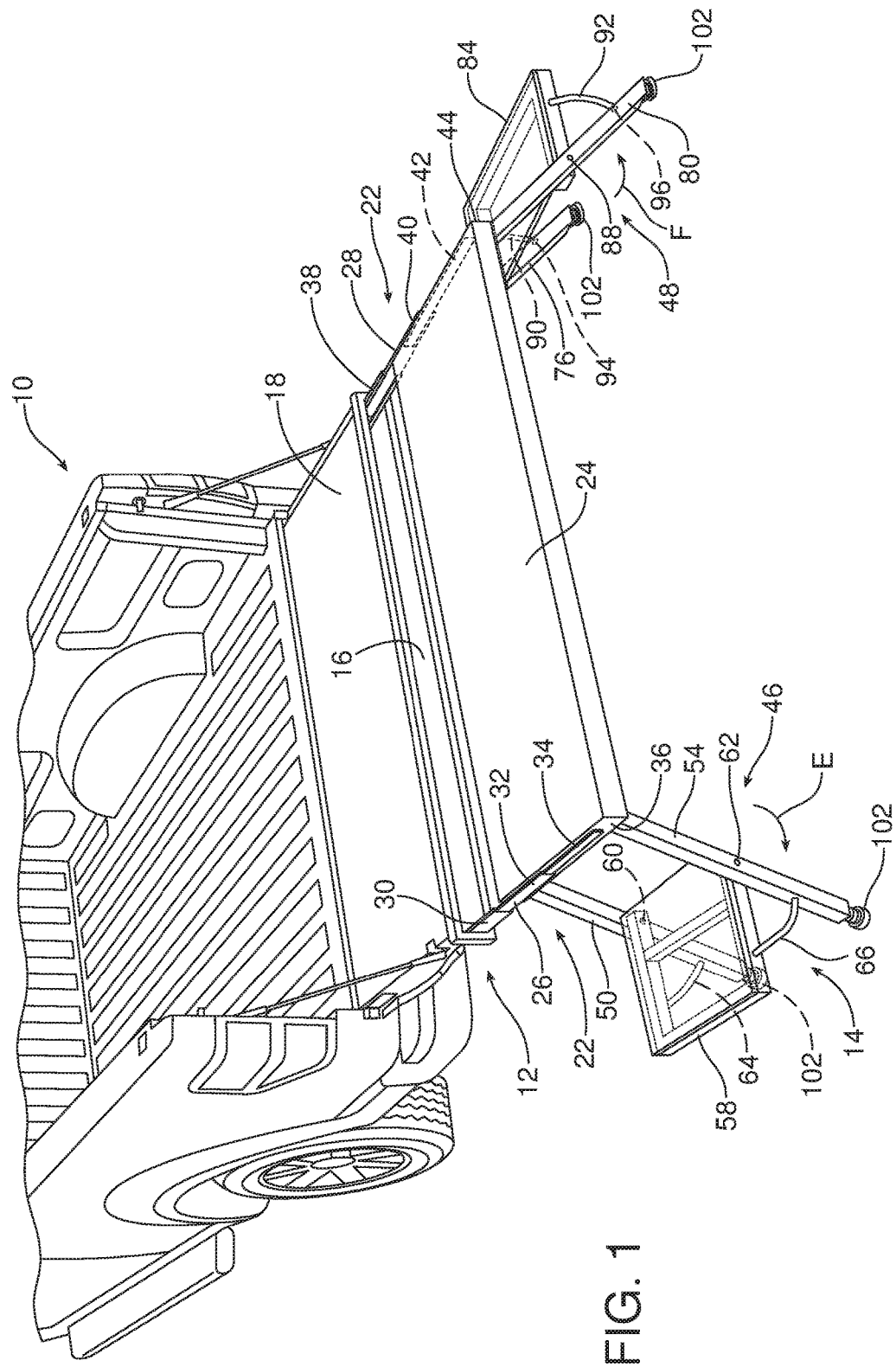
FIG. 1 is a perspective view illustrating the tailgate assembly with the table and seating subassembly fully deployed into the use position.
Figure 2A:
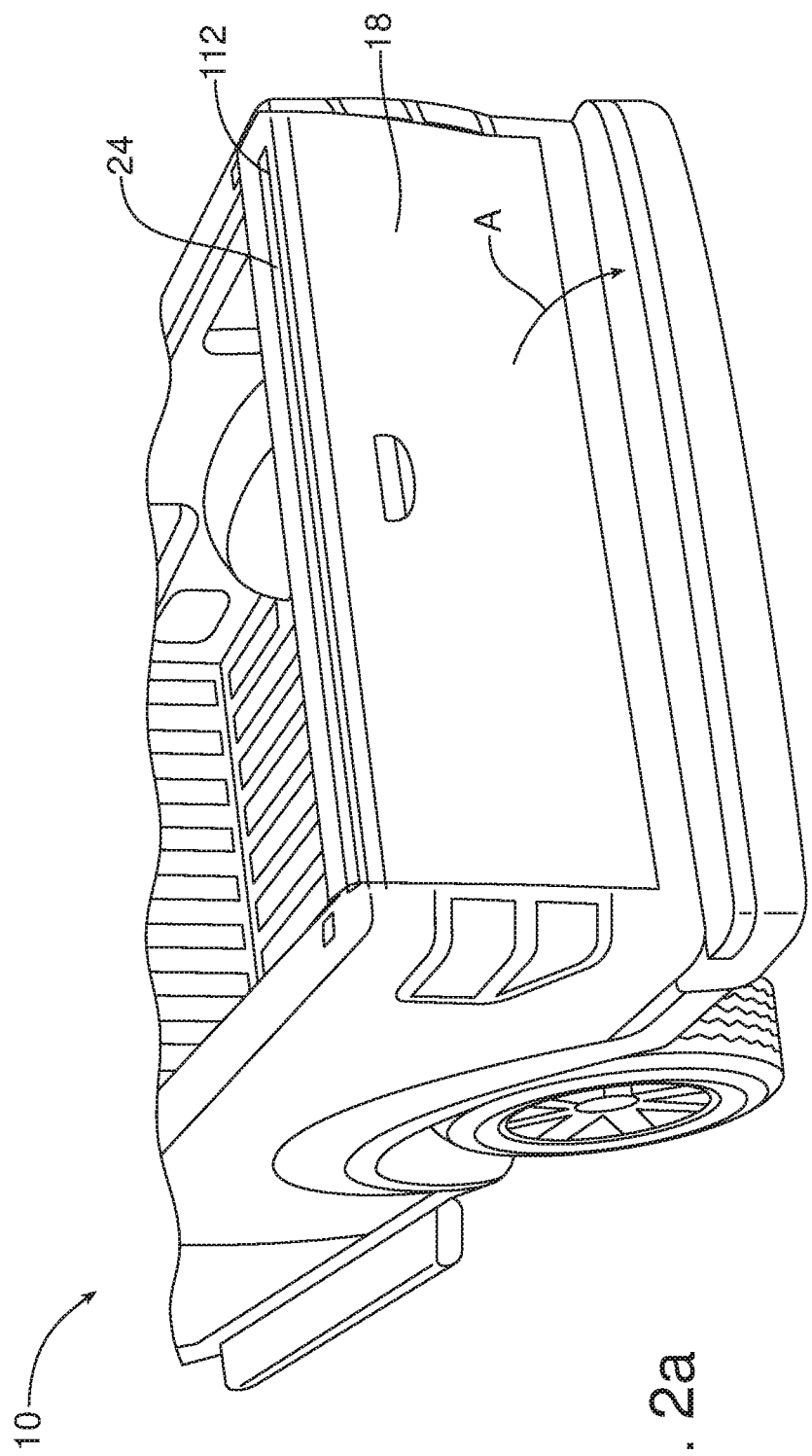
FIG. 2a illustrates the tailgate assembly with the table and seating subassembly in the stowed position and the tailgate raised.

Reference is now made to FIG. 1 illustrating a pickup truck 10 incorporating the new and improved tailgate assembly 12 having an integrated table and seating subassembly 14. The table and seating subassembly 14 is deployed from an internal storage compartment 16 in the tailgate 18 into the use position. In contrast, when the table and seating subassembly 14 is in the stowed position, the table and seating subassembly is held within the internal storage compartment 16 of the tailgate 18. See, for example, FIG. 2a illustrating the tailgate assembly 12 in the raised position with the table and seating subassembly 14 in the stowed position within the internal storage compartment 16. A latch (not shown) of substantially any type known in the art to be useful for such a purpose may be utilized to secure the table and seating subassembly 14 in the stowed position.

Figure 2B:
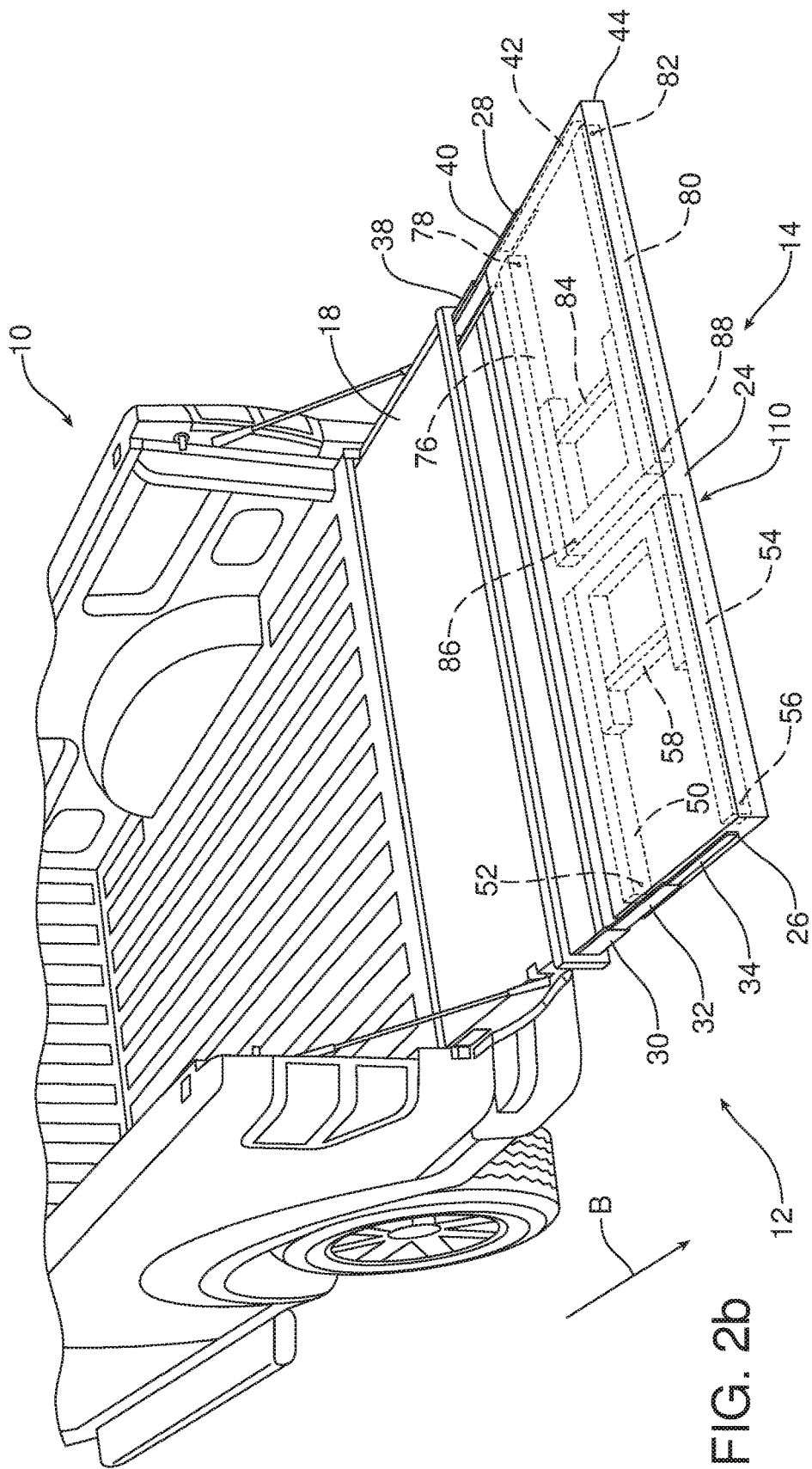
FIG. 2b illustrates the tailgate lowered and the table and seating subassembly displaced into an intermediate position wherein the table body has been slid out of the internal storage compartment of the tailgate and the two supports are still held against the table body in the storage cavity provided therein.

As best illustrated in FIG. 2b, a sliding track 22 connects the table body 24 of the table and seating subassembly 14 to the tailgate 18. In the illustrated embodiment, the sliding track 22 comprises a first telescoping rail 26 at a first side of the table body 24 and a second telescoping rail 28 at a second side of the table body.

More specifically, as illustrated, the first telescoping rail 26 includes a first section 30, a second section 32 and a third section 34. The first section 30 is secured to the tailgate 18 within the internal storage compartment 16. The third section 34 is secured to the first side 36 of the table body 24.

Similarly, the second telescoping rail 28 includes a first section 38, a second section 40 and a third section 42. The first section 38 is secured to the table body in the internal storage compartment 16 while the third section 42 is secured to the second side 44 of the table body 24. A detent (not shown) may be provided to lock the first telescoping rail 26 and the second telescoping rail 28 in the fully extended or use position when the table body 24 is fully withdrawn from the internal storage compartment as illustrated in FIG. 2b.

As best illustrated in FIGS. 1 and 2b-2d, the table and seating subassembly 14 includes a first support 46 and a second support 48 carried on the table body 24. First support 46 includes a first leg 50 connected by a first pivot 52 to the table body 24. The first support 46 also includes a second leg 54 connected by a second pivot 56 to the table body 24. In the illustrated embodiment the first pivot 52 and the second pivot 56 are provided at opposite corners formed with the first side 36 of the table body 24.

A first seat 58 is connected between the first leg 50 and the second leg 54. More specifically, a third pivot 60 connects the first seat to the first leg 50 while a fourth pivot 62 connects the first seat to the second leg 54. A first strut 64 and a second strut 66 are carried on and pivotally connected to the first seat 58.

Figure 2C:
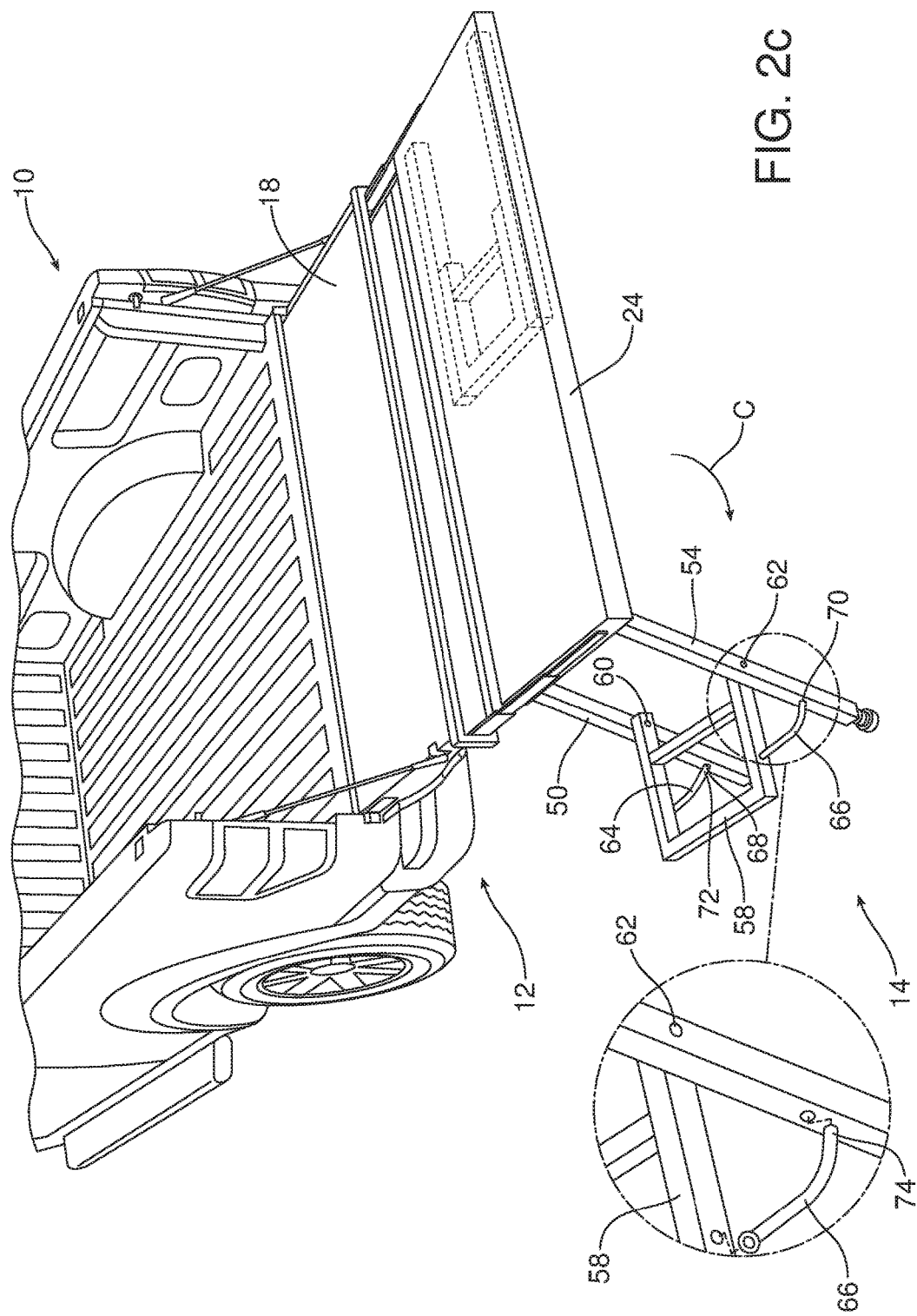
FIG. 2c is a detailed view illustrating how struts are used to pin the first seat in the use position with respect to the first and second legs.

As further and best illustrated in FIG. 2c, a first receiver 68 is provided on the first leg 50 and a second receiver 70 is provided on the second leg 54. When fully erected and deployed in the use position for seating, the first seat is held in a desired horizontal orientation by pinning a first distal end 72 of the first strut in the first receiver 68 on the first leg 50 and a second distal end 74 of the second strut 66 into the second receiver 70 on the second leg 54.

The second support 48 includes a third leg 76 connected by a fifth pivot 78 of the table body 24 and a fourth leg 80 connected by a sixth pivot 82 to the table body. As should be appreciated, the fifth pivot 78 and the sixth pivot 82 are at opposed corners adjacent the second side 44 of the table body.

A second seat 84 is connected between the third leg 76 and the fourth leg 80. As shown, the table and seating subassembly 14 includes a seventh pivot 86 connecting the second seat 84 to the third leg 76 and an eighth pivot 88 connecting the second seat to the fourth leg 80.

The table and seating subassembly 14 further includes a third strut 90 and a fourth strut 92 carried on and pivotally connected to the second seat 84.

As should be appreciated from viewing FIGS. 1 and 2c, a third receiver 94 is provided on the third leg 76 and a fourth receiver 96 is provided on the fourth leg 80. When the table and seating subassembly 14 is fully deployed into the use position, the second seat 84 may be held in a proper orientation for seating by pinning the third distal end of the third strut 90 in the third receiver 94 of the third leg 76 and the fourth distal end of the fourth strut 92 into the fourth receiver 96 of the fourth leg 80.

Figure 2D:
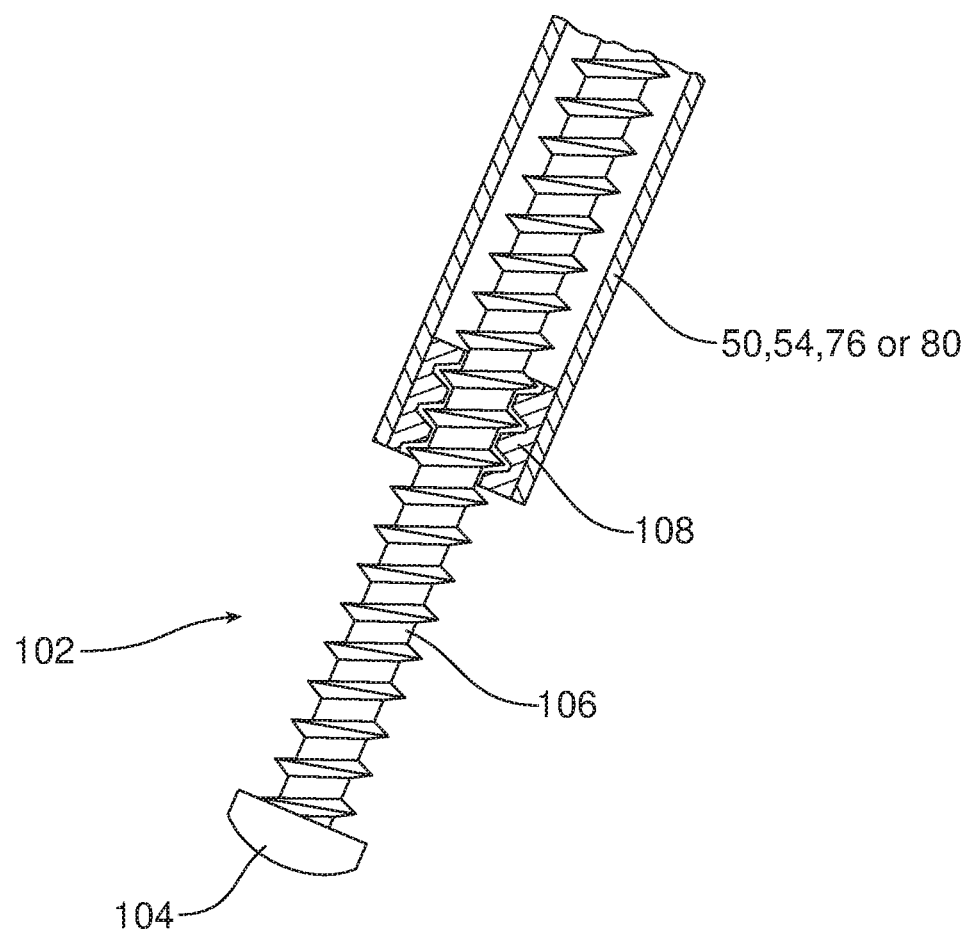
FIG. 2d is a detailed view illustrating how the length of one of the legs may be adjusted to provide proper support to hold the table body in a desired horizontal position.

As best illustrated in FIGS. 1 and 2d, each of the first leg 50, second leg 54, third leg 76 and fourth leg 80 may be made adjustable in length by providing each leg with a foot 102 having an end cap 104 held on a threaded shank 106 engaging in a threaded end 108 of the leg 50, 54, 76 or 80. One turns the foot 102 clockwise or counter clockwise to shorten or lengthen each leg 50, 54, 76, 80 in order to accommodate variations in the contour of the ground upon which the table body 24 is supported by the first support 46 and second support 48.

Reference is now made to FIGS. 2a-2d which generally illustrate how the table and seating subassembly 14 is deployed from the stowed position illustrated in FIG. 2a to the fully deployed use position illustrated in FIG. 1. As illustrated in FIG. 2a, first one pivots the tailgate in the direction of action arrow A from the raised position to the lowered position illustrated in FIG. 2b. Next, one slides the table and seating subassembly 14 out from the internal storage compartment 16 in the tailgate 18 by releasing the latch and pulling the table body 24 in the direction of action arrow B as illustrated in FIG. 2b. This extends the first and second telescoping rails 26, 28 of the sliding track 22. Upon reaching the fully extended position, a detent (not shown) may operate to lock the table body 24 in the position illustrated in FIG. 2b. In this intermediate position, the first support 46 and the second support 48 are still held in the storage cavity 110 provided in the underside of the table body 24.

This is then followed by the erecting of the first support 46 and the second support 48 of the table and seating subassembly 14. More specifically, a detent or latch (not shown) is released and the first and second legs 50, 54 of the first support are pivoted about the respective first pivot 52 and second pivot 56 in the direction of action arrow C until the detent is again engaged to hold the first support 46 in the deployed, use position illustrated in FIG. 1. The second support 48 including the third leg 76 and the fourth leg 80 are deployed in the same manner but in the opposite direction by pivoting about the respective fifth pivot 78 and sixth pivot 82.

This is then followed by displacing the first seat 58 and the second seat 84 in the direction of action arrows D and E respectively about the pivots 60, 62 and 86, 88 until the first and second seats are oriented in a horizontal position for supporting a seated user. The first seat 58 is then locked in the desired position by inserting the first distal end 72 of the first strut 64 in the first receiver 68 on the first leg 50 and the second distal end 74 of the second strut 66 in the second receiver 70 on the second leg 54.

Similarly, the second seat 84 is locked into this desired seating position by inserting the third distal end of the third strut 90 in the third receiver 94 on the third leg 76 and the fourth distal end of the fourth strut 92 in the fourth receiver 96 in the fourth leg 80. Of course, the length of any of the first leg 50, second leg 54, third leg 76 and fourth leg 80 may be adjusted by turning the respective foot 102 in a clockwise or counter clockwise direction as illustrated in FIG. 2*d* in order to accommodate any undulations in the ground upon which the deployed table body 24 is supported.

After use, the deployed table and seating subassembly 14 may be easily displaced from the use position illustrated in FIG. 1 to the stowed position illustrated in FIG. 2*a*. This is done by first removing the distal ends of the struts 64, 66, 90 and 92 from the receivers 68, 70, 94 and 96 and folding the first seat 58 and the second seat 84 into the stowed position. The first support 46 and second support 48 are likewise folded into the stowed position where the two supports are received within the storage cavity 110 in the underside of the table body 24 and held in place by the previously mentioned detents. The table body 24 is then displaced by means of the sliding track 22 until the table body is fully received and held in the internal storage compartment 16 of the tailgate 18 with the face 112 of the table body fitting flush with the top of the tailgate as illustrated in FIG. 2*a* to complete the process.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A tailgate assembly, comprising:
   a tailgate having an internal storage compartment; and
   a table and seating subassembly displaceable between a stowed position held in said internal storage compartment and a use position deployed from said internal storage compartment.

2. The tailgate assembly of claim 1, further including a sliding track connecting said table and seating subassembly to said tailgate.

3. The tailgate assembly of claim 2, wherein said sliding track includes a first telescoping rail and a second telescoping rail.

4. The tailgate assembly of claim 3, wherein said table and seating subassembly includes a table body.

5. The tailgate assembly of claim 4, wherein said table and seating subassembly includes a first support and a second support carried on said table body.

6. The tailgate assembly of claim 5, wherein said first support includes a first leg connected by a first pivot to said table body.

7. The tailgate assembly of claim 6, wherein said first support also includes a second leg connected by a second pivot to said table body.

8. The tailgate assembly of claim 7, wherein said table and seating subassembly includes a first seat connected between said first leg and said second leg.

9. The tailgate assembly of claim 8, wherein said table and seating subassembly includes a third pivot connecting said first seat to said first leg and a fourth pivot connecting said first seat to said second leg.

10. The tailgate assembly of claim 9, wherein said table and seating subassembly includes a first strut carried on said first seat.

11. The tailgate assembly of claim 10, wherein said table and seating subassembly includes a second strut carried on said first seat.

12. The tailgate assembly of claim 11, further including a first receiver on said first leg and a second receiver on said second leg, said first strut having a first distal end pinned into said first receiver and said second strut having a second distal end pinned into said second receiver when said table and seating subassembly is deployed into said use position.

13. The tailgate assembly of claim 12, wherein said second support includes a third leg connected by a fifth pivot to said table body.

14. The tailgate assembly of claim 13, wherein said second support also includes a fourth leg connected by a sixth pivot to said table body.

15. The tailgate assembly of claim 14, wherein said table and seating subassembly includes a second seat connected between said third leg and said fourth leg.

16. The tailgate assembly of claim 15, wherein said table and seating subassembly includes a seventh pivot connecting said second seat to said third leg and an eighth pivot connecting said second seat to said fourth leg.

17. The tailgate assembly of claim 16, wherein said table and seating subassembly includes a third strut carried on said second seat.

18. The tailgate assembly of claim 17, wherein said table and seating subassembly includes a fourth strut carried on said second seat.

19. The tailgate assembly of claim 18, further including a third receiver on said third leg and a fourth receiver on said fourth leg, said third strut having a third distal end pinned into said third receiver and said fourth strut having a fourth distal end pinned into said fourth receiver when said table and seating subassembly is deployed into said use position.

20. A method of deploying a table and seating from a tailgate, comprising:
    sliding a table and seating subassembly out from an internal storage compartment in said tailgate;
    erecting a first support and a second support of said table and seating subassembly;
    displacing a first seat and a second seat of said table and seating subassembly into use position; and
    locking said first seat and said second seat into said use position.

* * * * *